US012767435B2

(12) United States Patent
Lixin et al.

(10) Patent No.: US 12,767,435 B2
(45) Date of Patent: Oct. 20, 2026

(54) CONTAINER COVER AND DIAPER BUCKET

(71) Applicant: Ningbo Lisi Houseware Co., Ltd., Ningbo (CN)

(72) Inventors: Li Lixin, Ningbo (CN); Zhou Yongning, Ningbo (CN); Liu Junhui, Ningbo (CN); Wang Lu, Ningbo (CN)

(73) Assignee: Ningbo Lisi Houseware Co., Ltd., Ningbo (CN)

( * ) Notice: Subject to any disclaimer, the term of this patent is extended or adjusted under 35 U.S.C. 154(b) by 92 days.

(21) Appl. No.: 18/800,746

(22) Filed: Aug. 12, 2024

(65) Prior Publication Data

US 2026/0015163 A1 Jan. 15, 2026

(30) Foreign Application Priority Data

Jul. 12, 2024 (CN) ......................... 202410935603.4

(51) Int. Cl.
*B65F 1/16* (2006.01)
*B65F 1/06* (2006.01)

(52) U.S. Cl.
CPC .............. *B65F 1/1646* (2013.01); *B65F 1/06* (2013.01); *B65F 1/1607* (2013.01); *B65F 2210/167* (2013.01); *B65F 2240/132* (2013.01)

(58) Field of Classification Search
CPC ........ B65F 1/1646; B65F 1/06; B65F 1/1607; B65F 2210/167; B65F 2240/132
USPC ............... 220/259.1, 495.01, 495.07, 495.08
See application file for complete search history.

(56) References Cited

U.S. PATENT DOCUMENTS

2009/0127260 A1* 5/2009 Rousso .................. B65F 1/163 220/495.01

* cited by examiner

*Primary Examiner* — Jeffrey R Allen
*Assistant Examiner* — Elizabeth J Volz
(74) *Attorney, Agent, or Firm* — Frank Niranjan

(57) ABSTRACT

Disclosed are a container cover and a diaper bucket. The present disclosure belongs to the technical field of diaper buckets. According to the present disclosure, the container cover comprises: a cover body, the cover body is provided with an opening portion; a first flip, the first flip is hinged with the cover body, and the first flip can be rotated to a closed position or an opened position; a movable closing mechanism, the opening portion and the movable closing mechanism are arranged in an up and down corresponding manner, the movable closing mechanism comprises a pair of rotating parts, and the two rotating parts are both rotatably connected with the cover body; the relative position of the two rotating parts is determined by the position of the first flip.

16 Claims, 7 Drawing Sheets

CONTAINER COVER AND DIAPER BUCKET

This patent claims priority to Chinese Patent Application No. ZL202410935603.4, filed on Jul. 12, 2024, which is hereby incorporated by reference in its entirety for all purposes. Priority to Chinese Patent Application No. ZL202410935603.4 is hereby claimed.

TECHNICAL FIELD

The present disclosure belongs to the technical field of diaper buckets, and relates to a container cover and a diaper bucket.

BACKGROUND

The diaper changing process is common for most families with children. Presently, people use disposable diapers more and more commonly, and some people choose to simply throw dirty disposable diapers into the daily trash can, but dirty diapers will emit unpleasant odors.

Based on the above situation, there are currently some diaper buckets that can be used with ordinary trash bags; however, these diaper buckets have the problem of poor sealing. When the used diapers are thrown into the bucket, the odor of the diapers will be emitted from the gap of the diaper bucket opening; especially when the lids of diaper buckets are opened and closed each time, a strong odor will be emitted, so there is room for improvement.

SUMMARY

In view of the above technical problems existing in the prior at, an object of the present disclosure is to provide a container cover and a diaper bucket.

The object of the present disclosure can be achieved by the following technical solutions: a container cover, including:

- a cover body, wherein the cover body is provided with an opening portion;
- a first flip, wherein the first flip is hinged with the cover body, and the first flip can be rotated to a closed position or an opened position;
- a movable closing mechanism, wherein the opening portion and the movable closing mechanism are arranged in an up and down corresponding manner, the movable closing mechanism includes a pair of rotating parts, and the two rotating parts are both rotatably connected with the cover body;
- the relative position of the two rotating parts is determined by the position of the first flip; when the first flip is in the closed position, upper edges of the two rotating parts are spliced and the movable closing mechanism is in a clamped state; and when the first flip is in the opened position, lower edges of the two rotating parts are spliced and the movable closing mechanism is in a receiving state.

Preferably, the cover body includes a base and a second flip, the second flip is hinged with the base, the two rotating parts are both rotatably connected with the base, the opening portion is arranged at the second flip, the first flip is hinged with the second flip, the first flip is in a half-opened position when the second flip is opened; and when the first flip is in the half-opened position, a gap is reserved between both upper edges of the two rotating parts and lower edges of the two rotating parts and the movable closing mechanism is in a half-opened state.

Preferably, the movable closing mechanism forms a semi-spherical shell structure with the convex side facing to the opening portion when the upper edges of the two rotating parts are spliced; and the movable closing mechanism forms a semi-spherical shell structure with the concave side facing to the opening portion when the lower edges of the two rotating parts are spliced.

Preferably, the two rotating parts are both in linkage connection with the first flip, and the two rotating parts are driven to rotate in opposite directions when the first flip rotates.

Preferably, the two rotating parts are both provided with rotating shafts, the two rotating shafts are both rotatably connected with the cover body, the two rotating shafts are both provided with gears, the cover body is provided with a movable rack, the two gears are both meshed with the rack, and the first flip is in linkage connection with the rack.

Preferably, the container cover further includes a connecting rod, wherein one end of the connecting rod is hinged with the rack and the other end is hinged with the first flip, and the first flip, when rotating, drives the rack to move by means of the connecting rod.

Preferably, the cover body is provided with a guide slot, and the rack is movably mounted in the guide slot.

Preferably, tooth portions are provided on both sides of the rack, and the two gears are meshed with the two tooth portions respectively.

Preferably, the rotating shafts are provided with crank portions, the crank portions are connected with elastic reset parts, and the elastic reset parts are connected with the cover body.

A diaper bucket is also provided, including the container cover, further including a bucket body, wherein the cover body of the container cover is mounted on the bucket body.

Compared with the prior art, the present disclosure can achieve the following beneficial effects:

1. The first flip of the container cover can open and close, and the opening of a trash bag can be clamped by the movable closing mechanism to prevent odor diffusion when the first flip closes. When the first flip is opened, the movable closing mechanism can be enclosed into a pocket shape to receive trash and at the same time clamp the opening of the trash bag, and the trash can drop into the bucket body from the gap between the two rotating parts during closing of the first flip.

2. When the second flip is opened, the two rotating parts are just in a state that upper and lower edges are not in contact due to the position of the first flip, that is, the upper edges of the two rotating parts are not in contact, and meanwhile the lower edges of the two rotating parts are not in contact, so that the movable closing mechanism is in the half-opened state, and the trash bag can be replaced conveniently at the moment.

3. The two rotating parts are respectively provided with rotating shafts, the rotating shafts are provided with gears, a movable rack is arranged inside the cover body, and the rack is mutually meshed with the two gears. The first flip, when rotating, is connected with the rack by means of a connecting rod, so that the rack moves in the guide slot in the cover body. The movement of the rack drives the two gears meshed therewith to rotate, and further drives the two rotating parts to rotate in opposite directions.

4. The meshing of the gears with the rack ensures accurate synchronization of the two rotating parts. When the first flip drives the rack to move, the two gears are under the same force action synchronously, thereby ensuring that the two rotating parts rotate at the same speed and angle, and thus ensuring smooth rotation and positioning accuracy of the movable closing mechanism.

5. When there is no external force, the elastic reset part is used for exerting an action force to the rotating parts to drive the upper edges of the two rotating parts to be close, thereby exerting a closing reset force to the first flip by means of the structures of gears and the rack.

Figure 1:
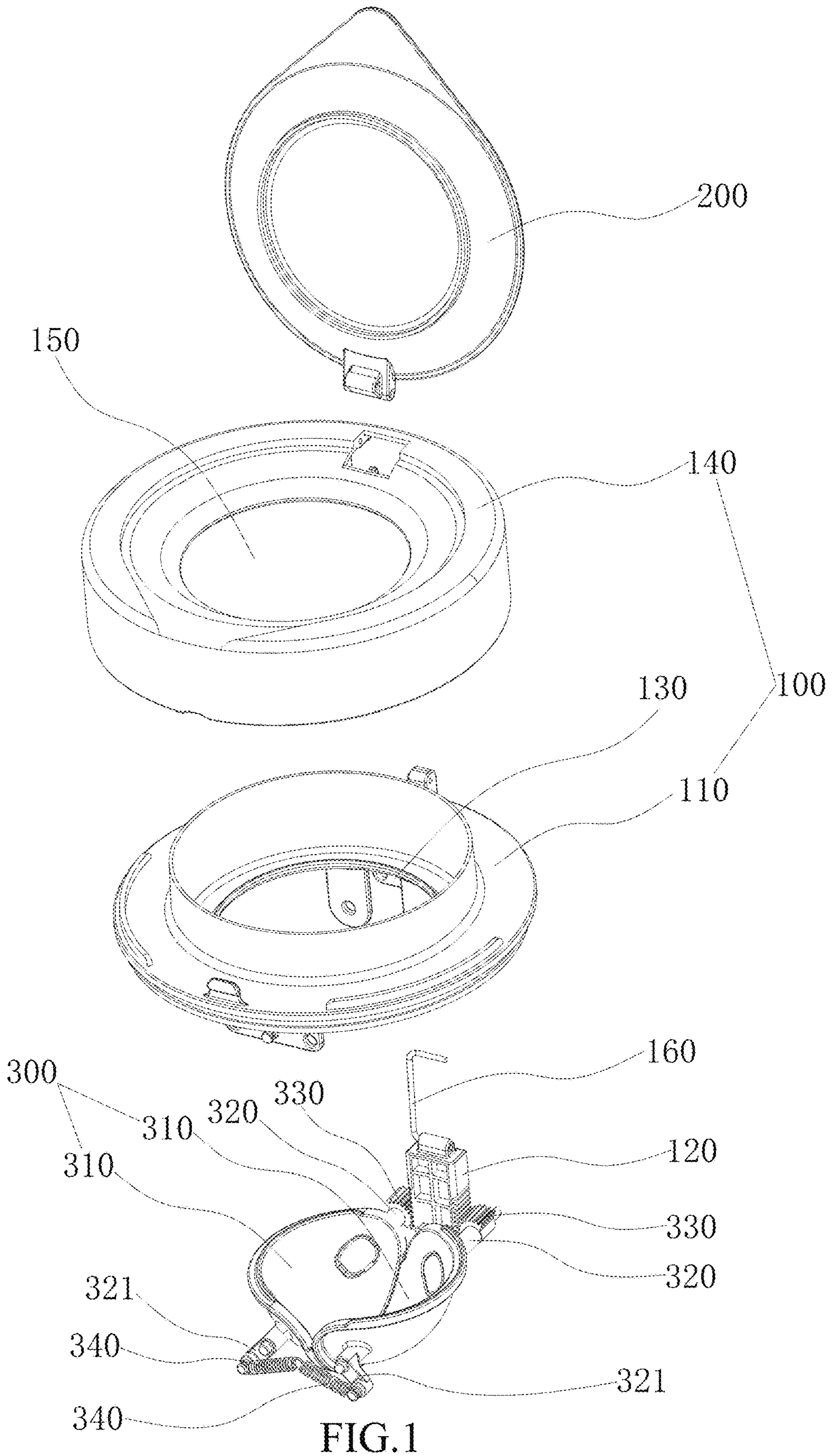
FIG. 1 is a structural exploded view of a container cover of the present disclosure.

Reference numerals: 100, cover body; 110, base; 120, rack; 121, tooth portion; 130, guide slot; 140, second flip; 150, opening portion; 160, connecting rod; 200, first flip; 300, movable closing mechanism; 310, rotating parts; 320, rotating shaft; 321, crank portion; 330, gear; 340, elastic reset part; 400, bucket body; 500, trash bag.

DETAILED DESCRIPTION OF THE EMBODIMENTS

The technical solutions of the present disclosure will be further described below in conjunction with the specific embodiments and accompanying drawings, but the present disclosure is not limited to these embodiments.

Figure 2:
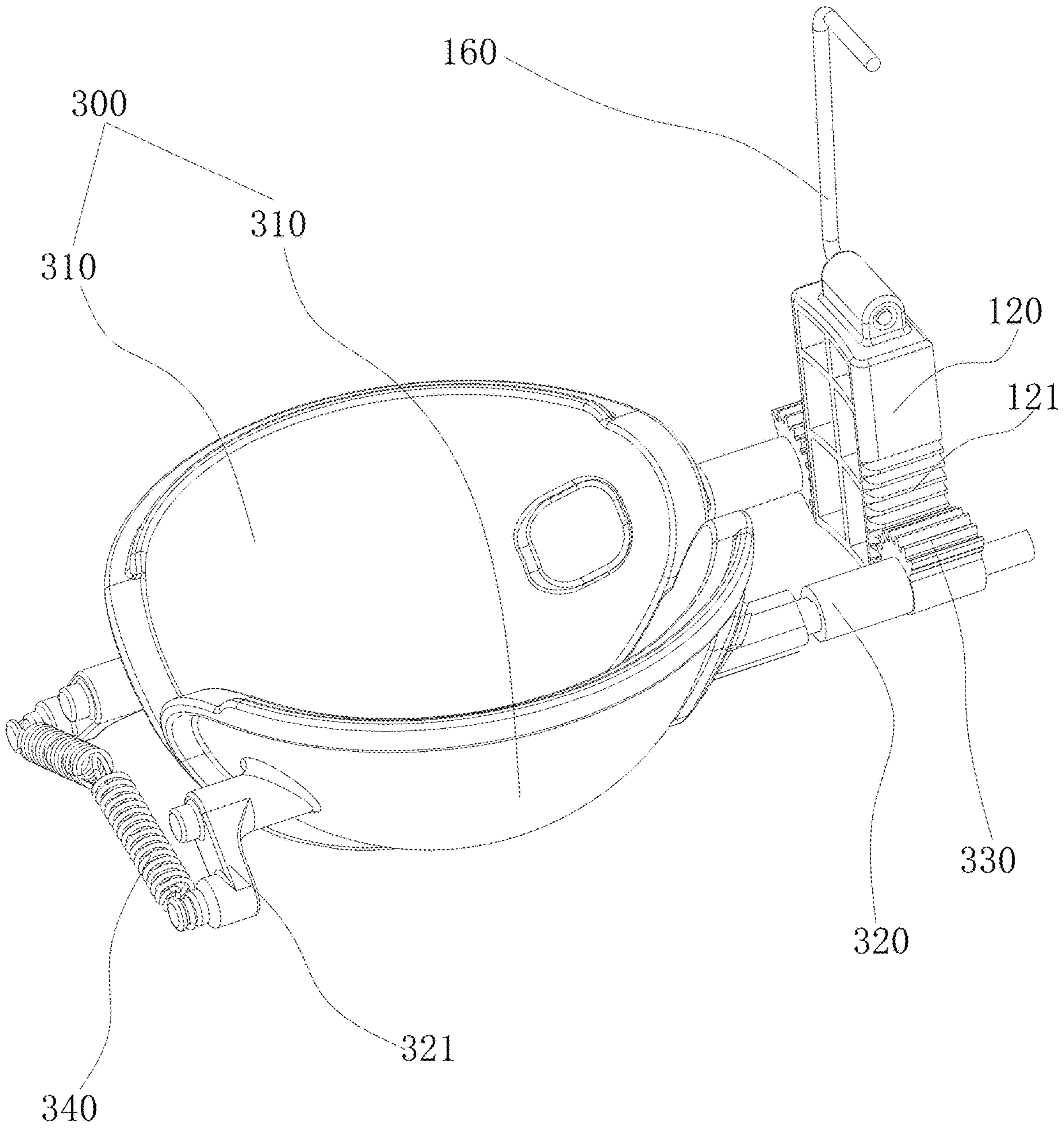
FIG. 2 is a structural schematic diagram of a movable closing mechanism of the present disclosure.
Figure 3:
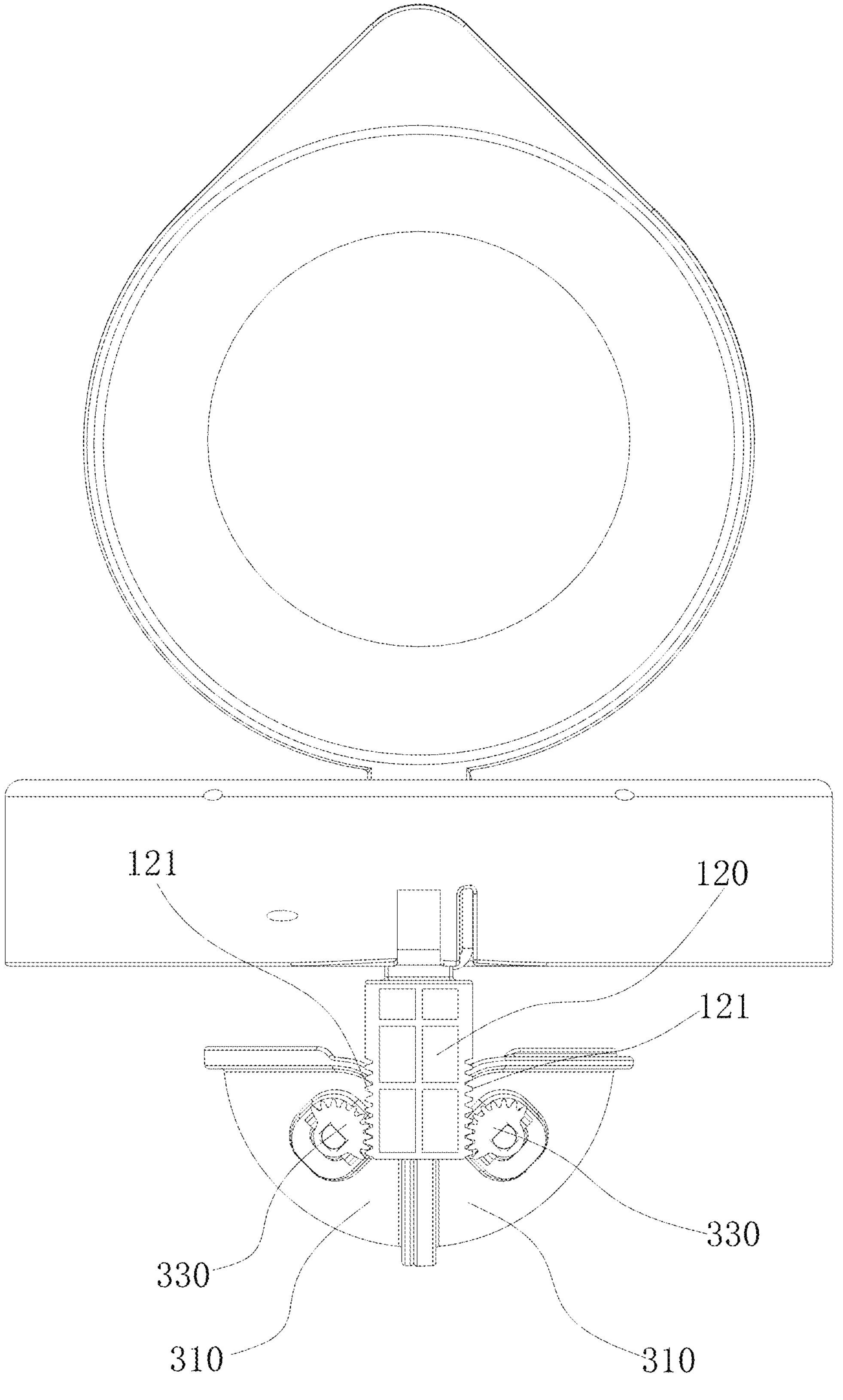
FIG. 3 is a schematic diagram illustrating the connection relationship between two rotating parts and a rack.
Figure 4:
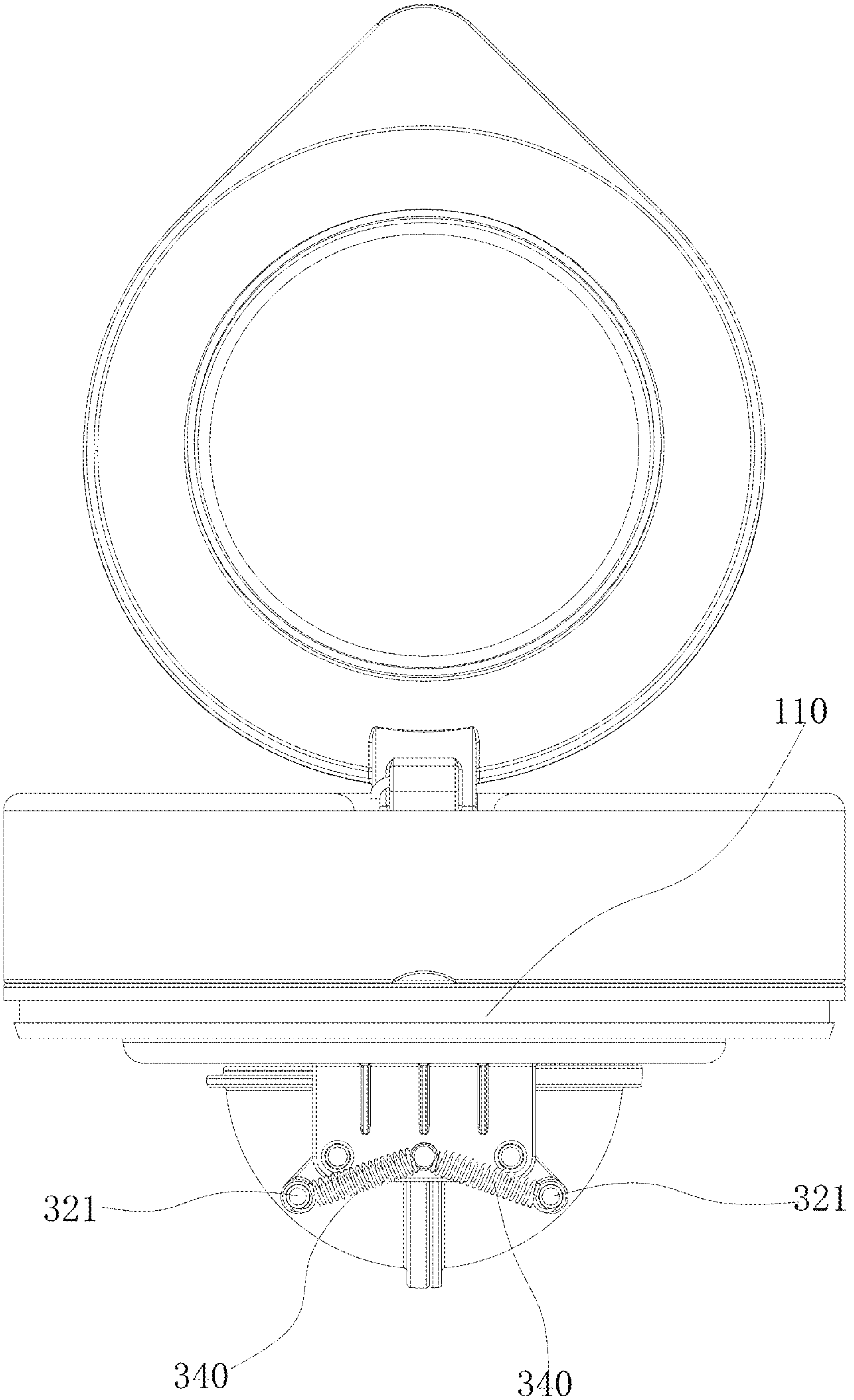
FIG. 4 is a schematic diagram illustrating the connection relationship between two rotating parts, elastic reset parts and a base.
Figure 5:
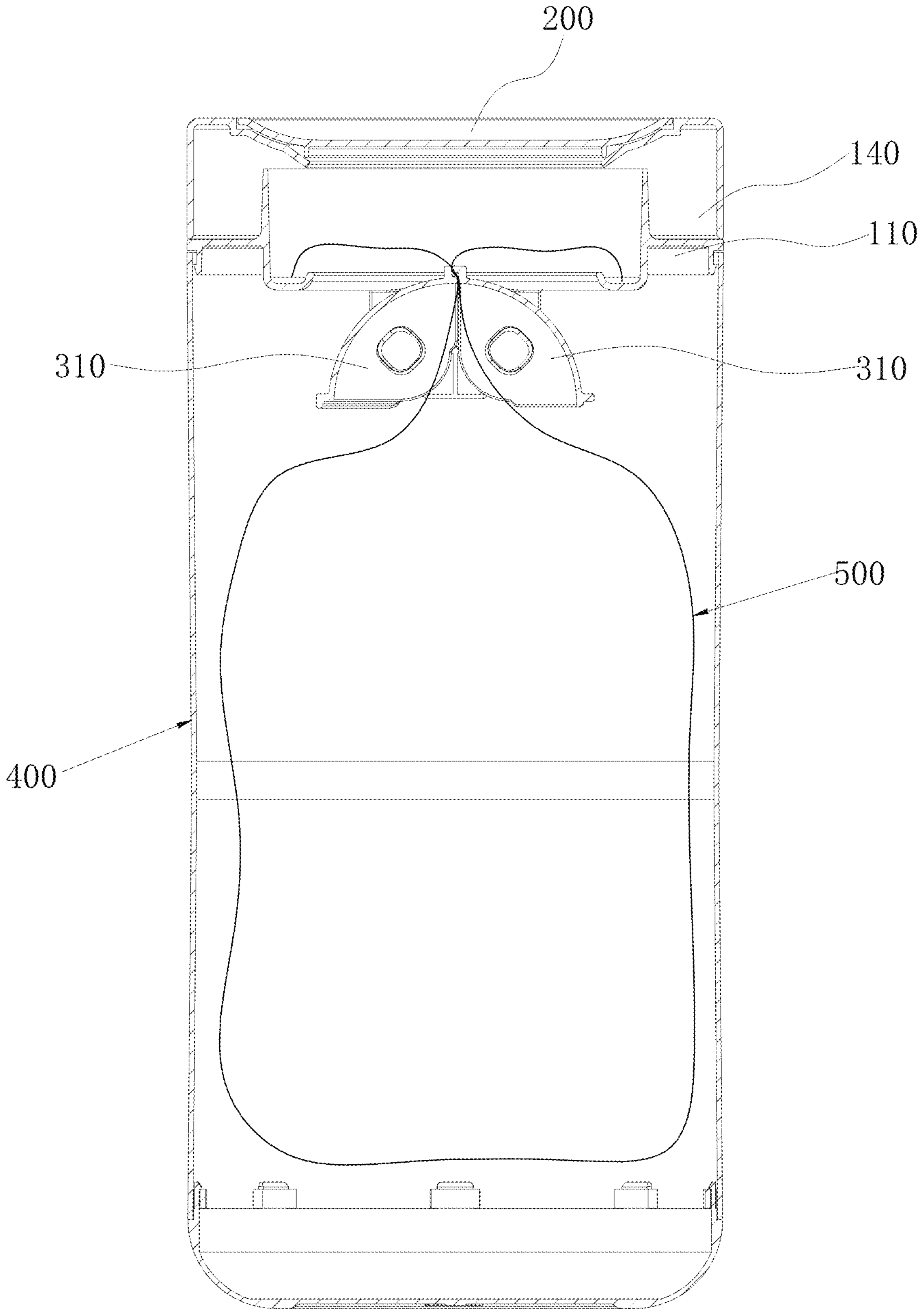
FIG. 5 is a schematic diagram of a first flip of a container cover of the present disclosure in a closed position.
Figure 6:
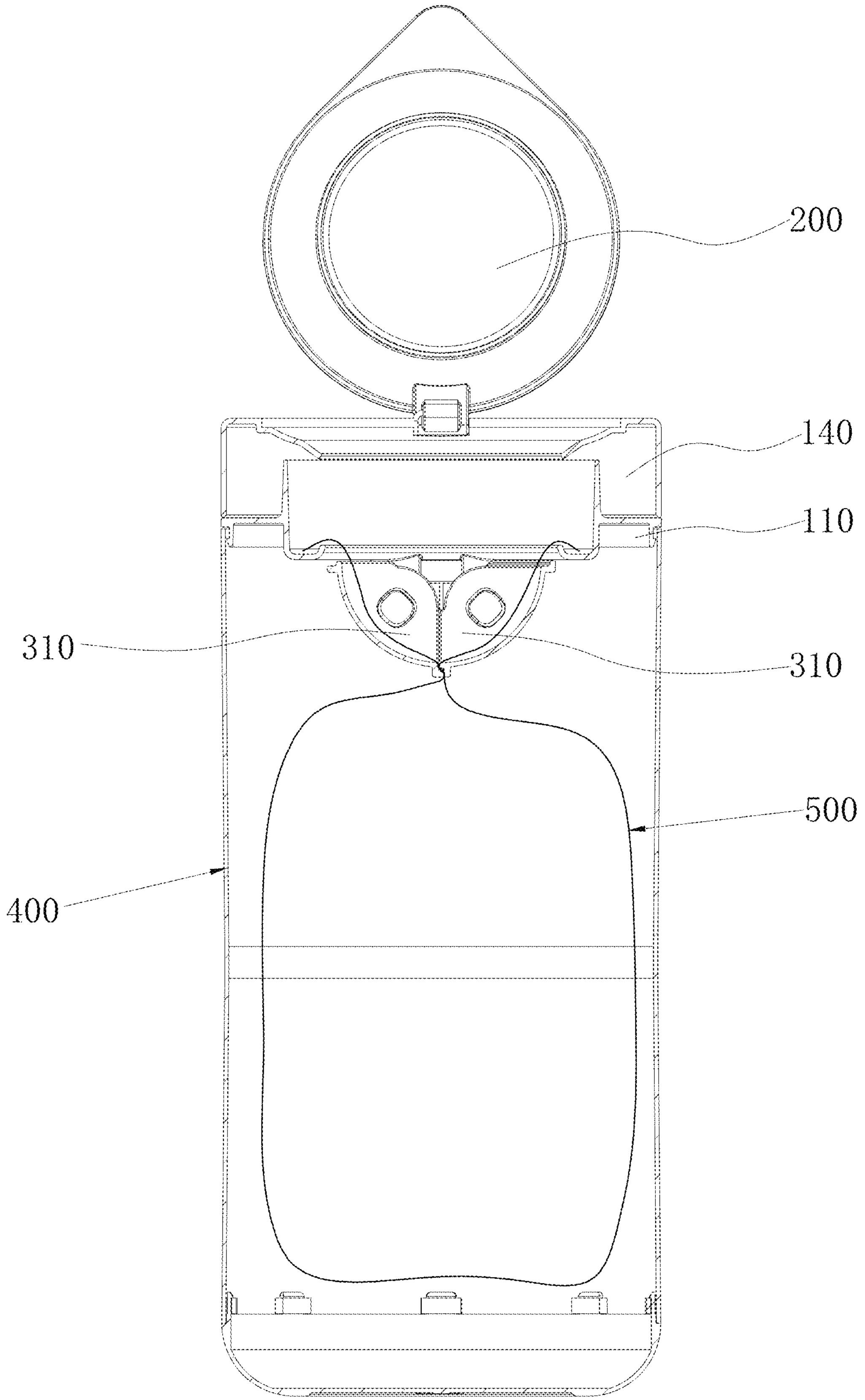
FIG. 6 is a schematic diagram of a first flip of a container cover of the present disclosure in an opened position.
Figure 7:
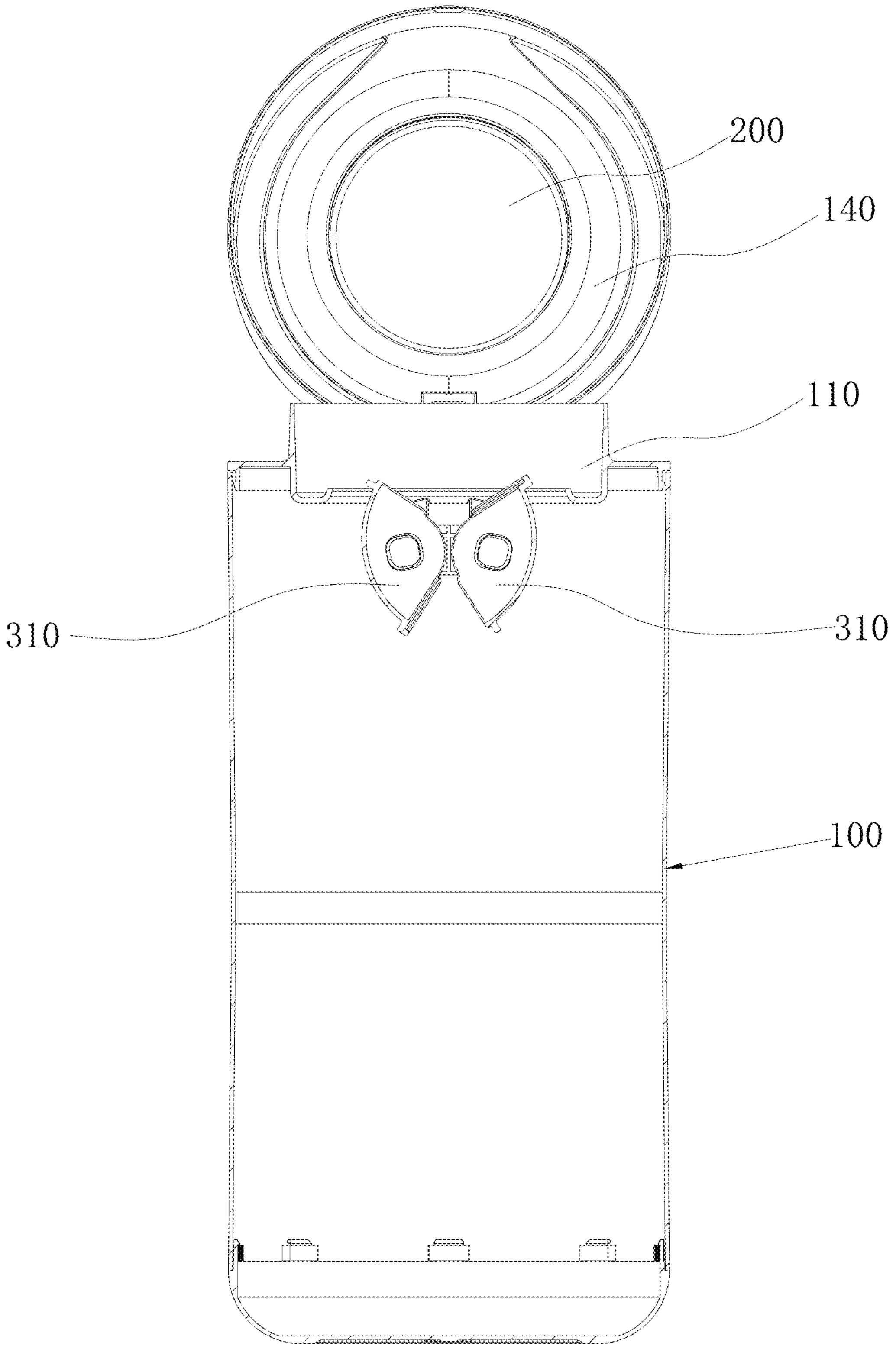
FIG. 7 is a structural schematic diagram of a second flip of a container cover of the present disclosure in an opened state.

As shown in FIGS. 1 to 7, a container cover include: a cover body 100, wherein the cover body 100 is provided with an opening portion 150; a first flip 200, wherein the first flip 200 is hinged with the cover body 100, and the first flip 200 can be rotated to a closed position or an opened position; a movable closing mechanism 300, wherein the opening portion 150 and the movable closing mechanism 300 are arranged in an up and down corresponding manner, the movable closing mechanism 300 includes a pair of rotating parts 310, and the two rotating parts 310 are both rotatably connected with the cover body 100; the relative position of the two rotating parts 310 is determined by the position of the first flip 200; when the first flip 200 is in the closed position, upper edges of the two rotating parts 310 are spliced and the movable closing mechanism 300 is in a clamped state; and when the first flip 200 is in the opened position, lower edges of the two rotating parts 310 are spliced and the movable closing mechanism 300 is in a receiving state.

The container cover can be applied to a diaper bucket or other garbage storage containers, and the opening portion 150 is used to put garbage (diapers) into the bucket body 400. The container cover is also equipped with a movable closing mechanism 300, which is composed of a pair of rotatable rotating parts 310. The two rotating parts 310 are symmetrically arranged and the positions thereof are controlled by the first flip 200.

There are two special positions for the two rotating parts 310, i.e., the upper edges of the two rotating parts 310 are spliced together such that the movable closing mechanism 300 forms a closed curved surface structure with the convex side facing to the opening portion 150, and this state is called a clamping state, i.e., the upper edges of the two rotating parts 310 can clamp the upper part of the bag opening of the trash bag 500, such that the bag opening of the trash bag 500 is in a closed state, thereby preventing the emission of odor; the lower edges of the two rotating parts 310 are spliced together to form a closed curved surface structure with the concave side facing to the opening portion 150, and this state is called a receiving state. Under the receiving state, the movable closing mechanism 300 can be enclosed into a pocket shape and received below the opening portion 150, which facilitates to receive the thrown garbage, and is capable of sealing the lower part of the bag opening of the trash bag 500 to prevent the spread of odor.

It should also be noted that when the first flip 200 rotates from the opened position to the closed position, the lower edges of the two rotating parts 310 gradually separate, and the upper edges of the two rotating parts 310 gradually approach each other, and at this time, the garbage (diapers) received by the movable closing mechanism 300 can fall into the bucket body 400, until the movable closing mechanism 300 returns to the clamping state to clamp the bag opening of the trash bag 500.

Therefore, when the container is in use, the first flip 200 is in a normally closed state, and the movable closing mechanism 300 is in a clamping state to clamp the bag opening of the trash bag 500; the first flip 200 is opened to put garbage from the opening portion 150, and then the first flip 200 is closed, and the garbage falls into the bucket body 400, and then the movable closing mechanism 300 continues to clamp the bag opening of the trash bag 500.

As shown in FIG. 1, FIG. 2, and FIGS. 5 to 7, on the basis of the above embodiments, the cover body 100 comprises a base 110 and a second flip 140, the second flip 140 is hinged with the base 110, the two rotating parts 310 are both rotatably connected with the base 110, the opening portion 150 is arranged at the second flip 140, the first flip 200 is hinged with the second flip 140, the first flip 200 is in a half-opened position when the second flip 140 is opened; and when the first flip 200 is in the half-opened position, a gap is reserved between both upper edges of the two rotating parts 310 and lower edges of the two rotating parts 310 and the movable closing mechanism 300 is in a half-opened state.

When the container cover is in normal use (i.e., when trash is put in the container), usually only the first flip 200 is used, and the second flip 140 is only needed to be opened when the trash bag 500 is replaced. Since the first flip 200 is hinged on the second flip 140, the angle position of the first flip 200 changes when the second flip 140 is opened, thereby the two rotating parts 310 are driven to rotate. When second flip 140 is opened, the position of the first flip 200 is just to enable the two rotating parts 310 to be in a state that the upper and lower edges are not in contact, i.e., the upper edges of the two rotating parts 310 are not in contact, and at the same time the lower edges of the two rotating parts 310 are not in contact, such that the movable closing mechanism 300 is in a half-opened state, and the trash bag 500 can be replaced very conveniently at this time.

On the basis of the above embodiments, the movable closing mechanism 300 forms a semi-spherical shell structure with the convex side facing to the opening portion 150 when the upper edges of the two rotating parts 310 are spliced; and the movable closing mechanism 300 forms a semi-spherical shell structure with the concave side facing to the opening portion 150 when the lower edges of the two rotating parts 310 are spliced.

When the upper edges of the two rotating parts 310 are spliced, the upper edges of the two rotating parts 310 can be in close contact, and at this time, the movable closing mechanism 300 forms a similar semi-spherical shell structure with the convex side facing upward, so that the bag opening of the trash bag 500 is effectively clamped by means of the upper edges of the two rotating parts 310 to prevent the odor from spreading. This structural design allows the bag opening of the trash bag 500 to be tightly closed. When the lower edges of the two rotating parts 310 are spliced, the movable closing mechanism 300 forms a semi-spherical shell structure with the concave side facing to the opening portion 150, which is called a "receiving state". In this state, the movable closing mechanism 300 can be enclosed into a pocket shape and located below the opening portion 150, to facilitate to receive the thrown garbage, such as dirty diapers. This design not only provides a temporary storage space for garbage, but also keeps the bag opening of the trash bag 500 to be closed to prevent the spread of odor.

As shown in FIGS. 1 to 7, on the basis of the above embodiments, the two rotating parts 310 are both in linkage connection with the first flip 200, and the two rotating parts 310 are driven to rotate in opposite directions when the first flip 200 rotates. The reason why the position of the first flip 200 determines the positions of the two rotating parts 310 is that the two rotating parts 310 are in linkage connection with the first flip 200. When the first flip 200 rotates, the two rotating parts 310 rotate in opposite directions, and when the first flip 200 stays at a certain position, the two rotating parts 310 also stay at the corresponding position.

On the basis of the above embodiments, the two rotating parts 310 are both provided with rotating shafts 320, the two rotating shafts 320 are both rotatably connected with the cover body 100, the two rotating shafts 320 are both provided with gears 330, the cover body 100 is provided with a movable rack 120, the two gears 330 are both meshed with the rack 120, and the first flip 200 is in linkage connection with the rack 120.

On the basis of the above embodiments, the container cover further includes a connecting rod 160, one end of the connecting rod 160 is hinged with the rack 120 and the other end is hinged with the first flip 200, and the first flip 200, when rotating, drives the rack 120 to move by means of the connecting rod 160.

On the basis of the above embodiments, the cover body 100 is provided with a guide slot 130, and the rack 120 is movably mounted in the guide slot 130.

Furthermore, two rotating shafts 320 are connected to the base 110 of the cover body 100, and the rack 120 is arranged in the base 110 of the cover body 100.

The two rotating parts 310 are provided with rotating shafts 320 respectively, and the rotating shafts 320 are provided with gears 330. A movable rack 120 is arranged inside the cover body 100, and the rack 120 is mutually meshed with the two gears 330. The first flip 200, when rotating, is connected with the rack 120 by means of a connecting rod 160, so that the rack 120 moves in the guide slot 130 in the cover body 100. The movement of the rack 120 drives the two gears 330 meshed therewith to rotate, and further drives the two rotating parts 310 to rotate in opposite directions.

On the basis of the above embodiments, tooth portions 121 are provided on both sides of the rack 120, and the two gears 330 are meshed with the two tooth portions 121 respectively. Meshing of the gears 330 with the rack 120 ensures accurate synchronization of the two rotating parts 310. When the first flip 200 drives the rack 120 to move, the two gears 330 are under the same force action synchronously, thereby ensuring that the two rotating parts 310 rotate at the same speed and angle, and thus ensuring smooth rotation and positioning accuracy of the movable closing mechanism 300.

As shown in FIGS. 1 to 4, on the basis of the above embodiments, the rotating shafts 320 are provided with crank portions 321, the crank portions 321 are connected with elastic reset parts 340, and the elastic reset parts 340 are connected with the cover body 100. Furthermore, both ends of the elastic reset parts 340 are connected to the base 110 of the cover body 100 and the rotating parts 310, respectively. When there is no external force, the elastic reset parts 340 are used for exerting an action force to the rotating parts 310 to drive the upper edges of the two rotating parts 310 to be close, thereby exerting a closing reset force to the first flip 200 by means of the structures of gears 330 and the rack 120.

As shown in FIGS. 1 to 7, a diaper bucket is also provided, including a container cover, further including a bucket body 400, wherein the cover body 100 of the container cover is mounted on the bucket body 400.

In an actual structure, a boxed trash bag 500 is mounted in the opening portion 150 of the cover body 100. The trash bag 500 passes through the two rotating parts 310 and spreads in the bucket body 400. When the first flip 200 is in the closed position, the movable closing mechanism 300 clamps the bag opening of the trash bag 500. When the first flip 200 is in the opened position, although the movable closing mechanism 300 also clamps the bag opening of the trash bag 500, the movable closing mechanism 300 is supported under the opening portion 150. Diapers can be thrown onto the movable closing mechanism 300. In the process of closing the first flip 200, the diapers on the movable closing mechanism 300 will automatically fall into the bucket body 400, so it is very convenient to use.

It should be noted that all directional indications (such as up, down, left, right, front, back, etc.) in the embodiments of the present disclosure are only used to explain the relative position relationship, movement, etc. between the components under a specific posture. If the specific posture changes, the directional indication will also change accordingly.

Furthermore, in the present disclosure, the descriptions such as "first", "second", "one", etc. are only used for descriptive purposes, and should not be construed as indicating or implying their relative importance or implicitly indicating the number of technical features indicated. Therefore, the features defined as "first" and "second" may explicitly or implicitly include at least one of the features.

In the present disclosure, unless otherwise clearly specified and defined, the terms "connection/connected", "fix/fixed", etc. should be understood in a broad sense. For example, "fix/fixed" can be fixedly connected, detachably connected or integrated; can be mechanically connected or electrically connected; can be directly connected or indirectly connected through an intermediate medium, can be internally communicated or mutually interacted between two elements, unless otherwise clearly defined.

Furthermore, the technical solutions between various embodiments of the present disclosure can be mutually combined provided that these solutions can be achieved by a person of ordinary skill in the art. When the combination of technical solutions is contradictory or cannot be implemented, it should be considered that such a combination of technical solutions does not exist and is not within the scope of protection of the present disclosure.

The invention claimed is:

1. A container cover, comprising:

a cover body, wherein the cover body is provided with an opening portion;

a first flip, wherein the first flip is hinged with the cover body, and the first flip can be rotated to a closed position or an opened position;

a movable closing mechanism, wherein the opening portion and the movable closing mechanism are arranged in an up and down corresponding manner, the movable closing mechanism comprises a pair of rotating parts, and the two rotating parts are both rotatably connected with the cover body;

the relative position of the two rotating parts is determined by the position of the first flip; when the first flip is in the closed position, upper edges of the two rotating parts are spliced and the movable closing mechanism is in a clamped state; and when the first flip is in the opened position, lower edges of the two rotating parts are spliced and the movable closing mechanism is in a receiving state;

wherein the cover body comprises a base and a second flip, the second flip is hinged with the base, the two rotating parts are both rotatably connected with the base, the opening portion is arranged at the second flip, the first flip is hinged with the second flip, the first flip is in a half-opened position when the second flip is opened; and when the first flip is in the half-opened position, a gap is reserved between both upper edges of the two rotating parts and lower edges of the two rotating parts and the movable closing mechanism is in a half-opened state.

2. The container cover according to claim 1, wherein the movable closing mechanism forms a semi-spherical shell structure with a convex side facing to the opening portion when the upper edges of the two rotating parts are spliced;

and the movable closing mechanism forms a semi-spherical shell structure with a concave side facing to the opening portion when the lower edges of the two rotating parts are spliced.

3. The container cover according to claim 1, wherein the two rotating parts are both in linkage connection with the first flip, and the two rotating parts are driven to rotate in opposite directions when the first flip rotates.

4. The container cover according to claim 3, wherein the two rotating parts are both provided with rotating shafts, the two rotating shafts are both rotatably connected with the cover body, the two rotating shafts are both provided with gears, the cover body is provided with a movable rack, the two gears are both meshed with the rack, and the first flip is in linkage connection with the rack.

5. The container cover according to claim 4, wherein the container cover further comprises a connecting rod, one end of the connecting rod is hinged with the rack and the other end is hinged with the first flip, and the first flip, when rotating, drives the rack to move by means of the connecting rod.

6. The container cover according to claim 4, wherein the cover body is provided with a guide slot, and the rack is movably mounted in the guide slot.

7. The container cover according to claim 4, wherein tooth portions are provided on both sides of the rack, and the two gears are meshed with the tooth portions respectively.

8. The container cover according to claim 4, wherein the rotating shafts are provided with crank portions, the crank portions are connected with elastic reset parts, and the elastic reset parts are connected with the cover body.

9. A diaper bucket, comprising the container cover of claim 1, further comprising a bucket body, wherein the cover body of the container cover is mounted on the bucket body.

10. A container cover, comprising:

a cover body, wherein the cover body is provided with an opening portion;

a first flip, wherein the first flip is hinged with the cover body, and the first flip can be rotated to a closed position or an opened position;

a movable closing mechanism, wherein the opening portion and the movable closing mechanism are arranged in an up and down corresponding manner, the movable closing mechanism comprises a pair of rotating parts, and the two rotating parts are both rotatably connected with the cover body;

the relative position of the two rotating parts is determined by the position of the first flip; when the first flip is in the closed position, upper edges of the two rotating parts are spliced and the movable closing mechanism is in a clamped state; and when the first flip is in the opened position, lower edges of the two rotating parts are spliced and the movable closing mechanism is in a receiving state;

the two rotating parts are both in linkage connection with the first flip, and the two rotating parts are driven to rotate in opposite directions when the first flip rotates;

the two rotating parts are both provided with rotating shafts, the two rotating shafts are both rotatably connected with the cover body, the two rotating shafts are both provided with gears, the cover body is provided with a movable rack, the two gears are both meshed with the rack, and the first flip is in linkage connection with the rack.

11. The container cover according to claim 10, wherein the movable closing mechanism forms a semi-spherical shell structure with a convex side facing to the opening portion when the upper edges of the two rotating parts are spliced;

and the movable closing mechanism forms a semi-spherical shell structure with a concave side facing to the opening portion when the lower edges of the two rotating parts are spliced.

12. The container cover according to claim 10, wherein the container cover further comprises a connecting rod, one end of the connecting rod is hinged with the rack and the other end is hinged with the first flip, and the first flip, when rotating, drives the rack to move by means of the connecting rod.

13. The container cover according to claim 10, wherein the cover body is provided with a guide slot, and the rack is movably mounted in the guide slot.

14. The container cover according to claim 10, wherein tooth portions are provided on both sides of the rack, and the two gears are meshed with the tooth portions respectively.

15. The container cover according to claim 10, wherein the rotating shafts are provided with crank portions, the crank portions are connected with elastic reset parts, and the elastic reset parts are connected with the cover body.

16. A diaper bucket, comprising the container cover of claim 10, further comprising a bucket body, wherein the cover body of the container cover is mounted on the bucket body.

* * * * *